(12) United States Patent
Salit et al.

(10) Patent No.: US 11,550,164 B2
(45) Date of Patent: Jan. 10, 2023

(54) HOLOGRAPHIC MODE FILTER FOR SUPER-RESOLUTION IMAGING

(71) Applicant: Honeywell International Inc., Morris Plains, NJ (US)

(72) Inventors: Mary Salit, Plymouth, MN (US); Lisa Lust, Minneapolis, MN (US); Jeffrey Michael Klein, Minneapolis, MN (US)

(73) Assignee: Honeywell International Inc., Charlotte, NC (US)

(*) Notice: Subject to any disclaimer, the term of this patent is extended or adjusted under 35 U.S.C. 154(b) by 416 days.

(21) Appl. No.: 16/781,909

(22) Filed: Feb. 4, 2020

(65) Prior Publication Data

US 2020/0256732 A1 Aug. 13, 2020

Related U.S. Application Data

(60) Provisional application No. 62/804,007, filed on Feb. 11, 2019.

(51) Int. Cl.
*G02B 27/58* (2006.01)
*G01J 3/18* (2006.01)
(Continued)

(52) U.S. Cl.
CPC ............ *G02B 27/58* (2013.01); *G01J 3/1838* (2013.01); *G01J 3/24* (2013.01); *G02B 27/4205* (2013.01);
(Continued)

(58) Field of Classification Search
CPC .... G02B 27/58; G02B 27/4205; G02B 5/203; G02B 5/32; G02B 23/12; G02B 27/1013; G02B 27/141; G02B 27/4277; G01J 3/1838; G01J 3/24; G03B 15/00; G03B 33/12; G03B 11/00; H04N 9/097

USPC .................. 348/345; 356/346, 244, 328, 334
See application file for complete search history.

(56) References Cited

U.S. PATENT DOCUMENTS

| 4,086,616 A | * | 4/1978 | Catano | ..................... H04N 3/09 348/E3.01 |
| 10,120,195 B1 | | 11/2018 | Bossert | |

(Continued)

FOREIGN PATENT DOCUMENTS

| EP | 1643292 A1 | 4/2006 |
| WO | WO-01/77629 A2 | 10/2001 |

OTHER PUBLICATIONS

Janez et al. (Holistic spectroscopy: complete reconstruction of a wide-field, multiobject spectroscopic image using a photonic comb, Aug. 13, 2018, MNRAS 480, 5475-5494 (2018) doi:10.1093/mnras/sty2175 (Year: 2018).*

(Continued)

*Primary Examiner* — Isiaka O Akanbi
(74) *Attorney, Agent, or Firm* — Schwegman Lundberg & Woessner, P.A.

(57) ABSTRACT

A method includes receiving collimated light from an optical imaging system and dividing the received light into multiple bands of wavelength. Each band is refocused onto a corresponding diffraction grating having an amplitude function matched to a point spread function (PSF) of the optical imaging system. The light that is not filtered out by the diffraction grating is transmitted onto a corresponding pixel array. An image is reconstructed from data provided by the pixel arrays for each band. The intensity of light scattered by each diffraction grating may be detected, with the image being reconstructed as a function of an average value of detected intensity of scattered light used to scale the known zero-order mode profile, which is added to the image on the pixel array.

17 Claims, 3 Drawing Sheets

(51) Int. Cl.

| | |
|---|---|
| *G01J 3/24* | (2006.01) |
| *H04N 9/097* | (2006.01) |
| *G03B 33/12* | (2006.01) |
| *G03B 15/00* | (2021.01) |
| *G02B 27/42* | (2006.01) |
| *G02B 5/20* | (2006.01) |
| *G02B 5/32* | (2006.01) |
| *G02B 23/12* | (2006.01) |
| *G02B 27/10* | (2006.01) |

(52) U.S. Cl.
CPC .............. *G03B 15/00* (2013.01); *G03B 33/12* (2013.01); *H04N 9/097* (2013.01); *G02B 5/203* (2013.01); *G02B 5/32* (2013.01); *G02B 23/12* (2013.01); *G02B 27/1013* (2013.01)

(56) References Cited

U.S. PATENT DOCUMENTS

2002/0039231 A1* 4/2002 Sela .................. G02B 27/4244
359/566
2006/0055926 A1* 3/2006 Wildnauer ............ G02B 27/58
356/328
2011/0147615 A1* 6/2011 Kintz ................ G02B 21/0076
359/385
2015/0271380 A1* 9/2015 Darty .................... G01J 3/0278
348/342
2016/0127702 A1* 5/2016 Tsao ........................ G06T 11/60
348/744
2016/0291332 A1* 10/2016 Moore .................. G02B 13/22
2020/0214541 A1 7/2020 Lust et al.

OTHER PUBLICATIONS

"European Application Serial No. 20156780.7, Response filed Feb. 5, 2021 to Extended European Search Report dated Jul. 13, 2020", 42 pgs.

"European Application Serial No. 20156780.7, Extended European Search Report dated Jul. 13, 2020", 7 pgs.

Janez, Kos, et al., "Holistic spectroscopy: Complete reconstruction of a wide-field, multi-object spectroscopic image using a photonic comb", arXiv:1804.05851v1 [astro-ph.IM] Apr. 16, 2018, Cornell University Library, Ithaca, NY 14853, (Apr. 16, 2018), 22 pgs.

* cited by examiner

HOLOGRAPHIC MODE FILTER FOR SUPER-RESOLUTION IMAGING

RELATED APPLICATION

This application claims priority to U.S. Provisional Application Ser. No. 62/804,007 (entitled Holographic Mode Filter for Super-resolution Imaging, filed Feb. 11, 2019) which is incorporated herein by reference.

BACKGROUND

Primary optics for large aperture telescopes are massive, expensive, and can have a very long lead time for manufacturing. Primary optics for telescopes with smaller apertures don't suffer from these disadvantages, but their resolving power is smaller. Fine details are blurred. The trade-off between aperture size and expense puts limits on the telescope resolution achievable in applications like navigation by landmark or stars (without GPS), surveillance/reconnaissance (terrestrial, aerial and space based), defense against orbital and suborbital weapons, targeting/tracking systems, formation keeping and obstacle avoidance.

SUMMARY

A method includes receiving collimated light from an optical imaging system and dividing the received light into multiple bands of wavelength. Each band is refocused onto a corresponding diffraction grating having an amplitude function matched to a point spread function (PSF) of the optical imaging system. The light that is not filtered out by the diffraction grating is transmitted onto a corresponding pixel array. An image is reconstructed from data provided by the pixel arrays for each band. The intensity of light scattered by each diffraction grating may be detected, with the image being reconstructed as a function of an average value of detected intensity of scattered light used to scale the known zero-order mode profile, which is added to the image on the pixel array.

DETAILED DESCRIPTION

Figure 1:
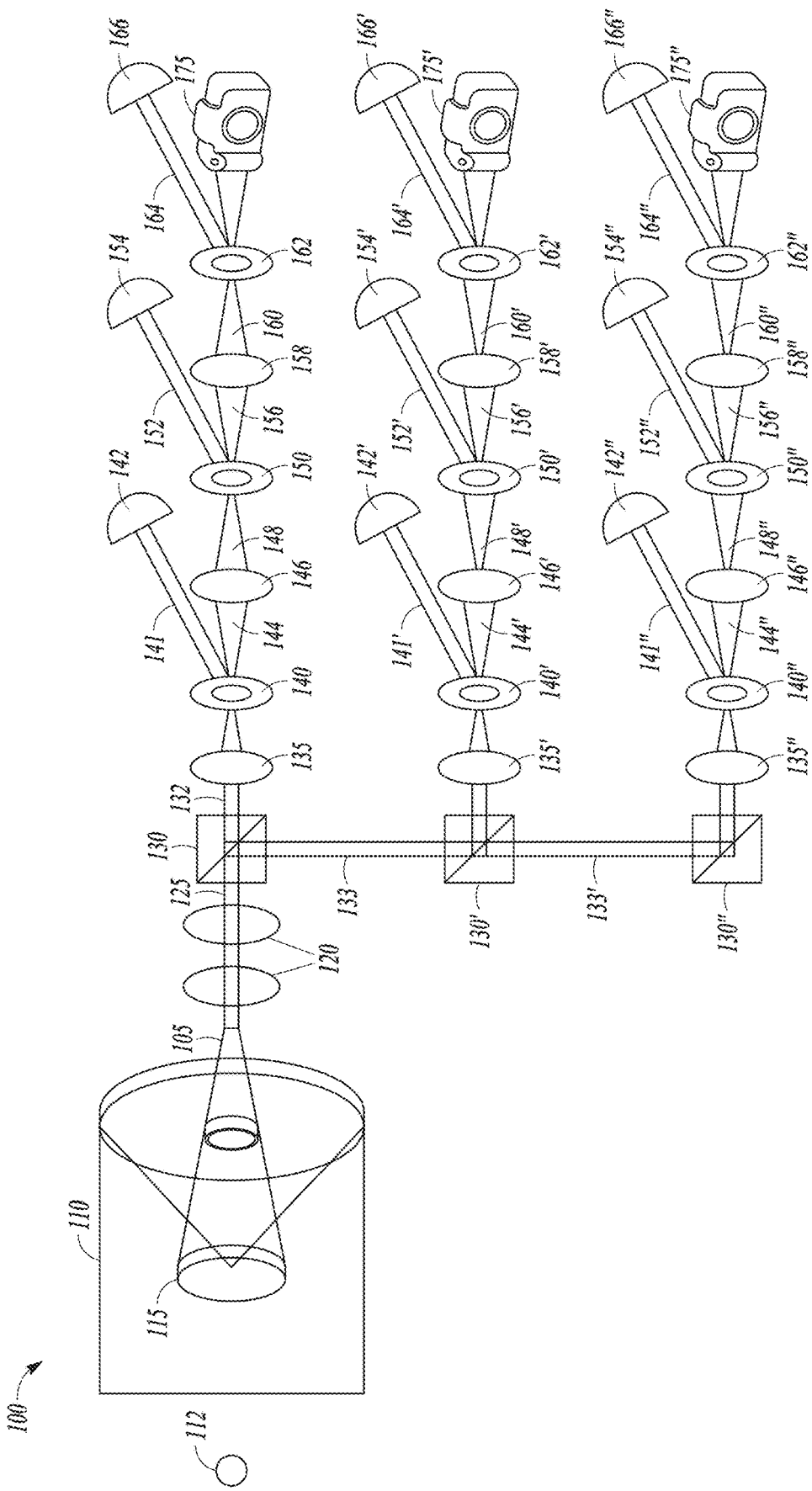
FIG. 1 is a block diagram of a zero-mode filter system for receiving light from an optical imaging system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A point spread function (PSF) describes the response of an imaging system to a point source or a point object. The degree of spreading (blurring) of a point object is a measure for the quality of an imaging system. In non-coherent imaging systems such as fluorescent microscopes, telescopes or optical microscopes, the image formation process is linear in power and described by linear system theory. This means that when two objects A and B are imaged simultaneously, the result is equal to the sum of the independently imaged objects. In other words: the imaging of A is unaffected by the imaging of B and vice versa, owing to the non-interacting property of photons. The image of a complex object can then be seen as a convolution of the true object and the PSF. However, when the detected light is coherent, image formation is linear in the complex field. Recording the intensity image then can lead to cancellations or other non-linear effects.

Finite telescope apertures act as spatial frequency filters, attenuating the amplitude of the higher spatial frequencies compared to lower spatial frequencies in an image. It is possible to construct an image processing scheme which re-amplifies the signal at higher spatial frequencies—multiplying the Fourier transform of the image by some function which is larger for higher spatial frequencies, the inverse of the filter—and thus restores the original image. "Deconvolution" algorithms do just that. But there are limits to the effectiveness of deconvolution.

When the (small) signals at the higher spatial frequencies are amplified, any noise on those signals is amplified as well, and the signal-to-noise ratio is not improved. So, while deconvolution would allow reconstruction of perfect images from any size telescope aperture in a world without noise, in the real world it can only do so much. No matter how much effort is made to eliminate noise, such as by possibly cooling and isolating every part of the system, quantum noise, at least, is inevitable. Ultimately quantum noise, if nothing else, will limit the ability to reconstruct the image.

The effect of quantum noise may be mitigated by performing the measurement differently. The image that the telescope is attempting to capture is a map of the intensity of an optical field as a function of x and y in the image plane, and the measurement of that optical field intensity is typically done by a pixel array. Each pixel is a detector making an independent measurement of the intensity. Each measurement has an uncertainty related to the square root of the intensity at that pixel, due to quantum noise.

The low-spatial-frequency parts of the electric field which form the image (in which there is a lot of brightness due to the low-pass-filter nature of the aperture) spread themselves (and their quantum noise) across many pixels, while carrying very little information about the details of the image. Since each of the measurements is independent, two neighboring pixels may read different values, which results in a spurious signal with a high spatial frequency. In this way, an electric field component which has a low spatial frequency can inject noise into the image at all spatial frequencies, since a bunch of independent measurements of its intensity are being performed at different positions.

In one embodiment of the present inventive subject matter, the lowest spatial frequency part of the image (the "zeroth order mode") is filtered out before making any measurement of the intensity. That component of the electric field is physically separated out such that it is not incident on a pixel array at all. Measurement noise will be correspondingly lower. The intensity incident on each pixel will be smaller, and so will the shot noise. The total power in the zeroth order mode may be separately measured with a single-pixel "bucket" detector which integrates the intensity over the whole mode profile. The known spatial distribution of that mode is used to add that component back in. The image can then be deconvolved more successfully. The filtered components can be amplified, and there will be less noise at those frequencies to be amplified along with the signal.

FIG. 1 is a block diagram of a zero-mode filter system 100 for receiving light 105 from an optical imaging system 110, such as a telescope or microscope. The light 105 is received from an object 112 that reflects of an aperture 115 and a mirror 117 in the case of a reflecting telescope. The telescope may also be a refracting telescope with multiple lenses. The light 105 is collimated via a collimator 120 to provide collimated light 125. The light may already be collimated by the optical imaging system 110 via adaptive optics in some embodiments, obviating the need for a separate collimator to produce the collimated light 125. The collimated light 125 is provided to a beamsplitter 130 or other wavelength selective element.

Beamsplitter 130 may be a dichroic beamsplitter that divides the light into bands, first band 132 and 133. First band 132 may comprise red light that is focused by a lens 135 onto a first diffraction grating 140. Band 133 contains the remaining light. The diffraction grating 140 has an amplitude function matched to the PSF of the optical imaging system 110. Light which is mode matched to the diffraction grating 140 is scattered at 141 onto a first detector 142. First detector 142 may also be referred to as a Zero Order Mode photodetector.

In some embodiments, beamsplitter 130 may be a diffraction grating, prism, or other means of separating the spectral components. In other embodiments, the light might be collimated after being spectrally separated rather than before being separated.

Light that is not filtered out by the diffraction grating is transmitted at 144 and focused by lens 146 as indicated at 148 onto a successive or second diffraction grating 150. In various embodiments light that gets transmitted directly through is still sometimes referred to as "forward scattering." Further implementations may also utilize reflective gratings, where both the "filtered" and "unfiltered" light are reflected—just at different angles to appropriate optical components, such as detectors and further gratings.

The second diffraction grating 150 also has an amplitude function matched to the PSF of the optical imaging system 110. The second diffraction grating 150 scatters mode matched light 152 onto a second detector 154 and transmits 156 light that is not filtered out by the diffraction grating via lens 158 to focus the light 160 that is not filtered out by the diffraction grating onto a third diffraction grating 162. Third diffraction grating 162 scatters light at 165 to a third detector 166 and transmits light that is not filtered out by the diffraction grating at 170 to a pixel array 175. The pixel array 175 may include a low noise charge-coupled device (CCD) to capture images.

Third diffraction grating 162 is the third in a succession of diffraction gratings having amplitude functions matched to the PSF of the optical imaging system 110. In various embodiments, a number, n, of successive diffraction gratings and corresponding detectors may be used prior to transmitting the final light that is not filtered out by the diffraction grating to the pixel array 175 sufficient to scatter greater than 99% of the light in grating mode is scattered. In some embodiments, 85% or greater, or 99.9% or greater may be sufficient.

Further beamsplitters 130' and 130" may be used to further split the light 105 into further bands indicated at 132' and 132", which may correspond to green and blue bands of light. In further embodiments, still further bands may be divided. Each of the bands is processed in the same manner as first band 132, which corresponding optical elements designated in FIG. 1 with a "'" or "''" respectively.

Figure 2:
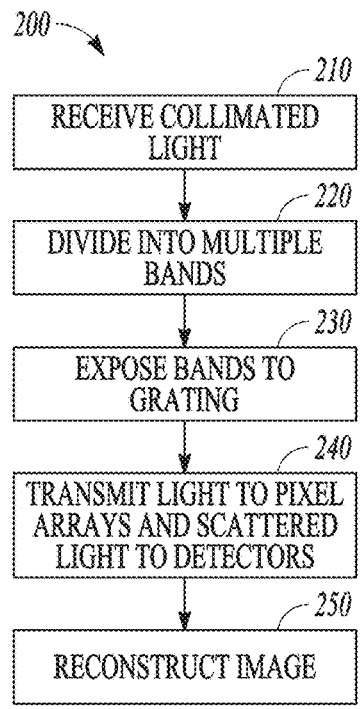
FIG. 2 is a flowchart illustrating a computer assisted method of generating an image from light detected from an object by an optical imaging system according to an example embodiment.

FIG. 2 is a flowchart illustrating a computer assisted method 200 of generating an image from light detected from an object by an optical imaging system, such as a telescope. Method 200 begins by collimating at operation 210, light received from an optical imaging system. At operation 220, the received light is divided into multiple bands of wavelength, such as by a dichroic beamsplitter for each band. The multiple bands may correspond to red, green, and blue bands. Each band is refocused at operation 230 onto a corresponding diffraction grating having an amplitude function matched to a point spread function (PSF) of the optical imaging system. The light that is not filtered out by the diffraction grating is transmitted at operation 240 onto a corresponding pixel array. At operation 250, the image is reconstructed from the pixel arrays for each band.

In one embodiment, operation 240 may include detecting an intensity of light scattered by each diffraction grating. Operation 250 reconstructs the image as a function of an average value of detected intensity of scattered light. The image may be reconstructed as a function of the average value of scattered light, the pattern on the pixel arrays, and a pattern corresponding to a source of the light received from the optical imaging system. The average value of light may be empirically determined.

In one embodiment, the diffraction grating for each band may include multiple successive amplitude function matched diffraction gratings. The number of successive amplitude function matched diffraction gratings for each band may include a number sufficient to scatter greater than 99% of light in grating mode.

In various embodiments, the diffraction gratings are a customized diffractive optical element that includes a grating pattern on which a contrast mask (an apodization filter) is imposed. The contrast mask matches the shape of the PSF. In order to create enough coherence in a source light to allow efficient diffraction by gratings, a telescope output is collimated, and dielectric stack mirrors (such as a dichroic beamsplitter) with narrowband reflectance are positioned to separate out different spectral bands.

The collimated light is refocused from each of multiple wavelength bands to be incident on the diffraction grating with an amplitude function matched to the PSF of the telescope.

Light which is mode matched to the grating is scattered onto the corresponding detectors (142, 154, 166) a single-pixel detector—the rest is transmitted. Because this scattering will not be 100% efficient, the diverging field is refocused on another grating, which again scatters the lowest order mode. This process is repeated until the filtering is sufficient to scatter greater than 99% of light in grating mode. As mentioned previously, other percentages may be sufficient in further embodiments, such as 85% or 99.9% to name a few percentages. Remaining transmitted light is incident on the pixel arrays 175.

Finally, the image is computationally reconstructed via a controller coupled to receive values representative of the measured total intensity of the light in scattered mode (summed from all of the different detectors), which provides a coefficient of the lowest spatial frequency component of the image, and the intensity pattern on each pixel array from which the intensity of the higher spatial frequency components are measured.

Figure 3:
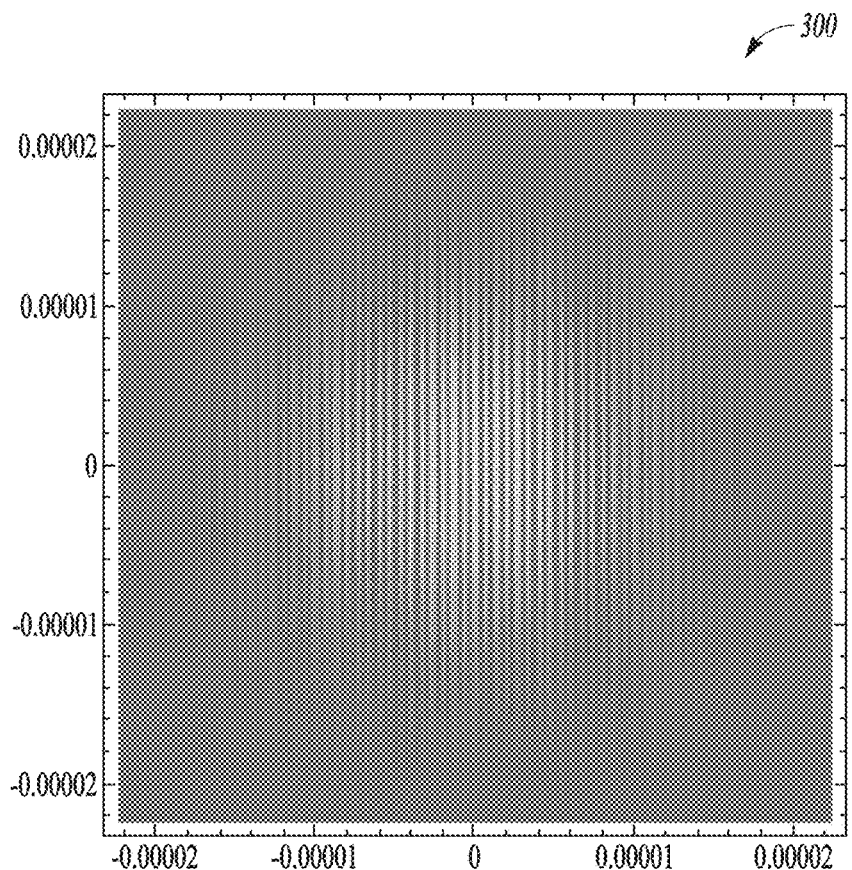
FIG. 3 is an image of a Gaussian hologram utilized for the diffraction gratings according to an example embodiment.

FIG. 3 is an image of a Gaussian hologram 300 utilized for the diffraction gratings, such as diffraction grating 140. The shape and size of the hologram 300 are designed to match the shape and size of the telescope PSF.

A hologram is a photographic recording of a light field, rather than of an image formed by a lens. The hologram itself is not an image and is usually unintelligible when viewed under diffuse ambient light. It is an encoding of the light field as an interference pattern of seemingly random variations in the opacity, density, or surface profile of the photographic medium. The interference pattern diffracts the light into a reproduction of the original light field. The hologram 300 may be made by interfering SPF with a reference beam.

Finite telescope apertures act as spatial frequency filters, attenuating the amplitude of the higher spatial frequencies compared to lower spatial frequencies in an image. This is because diffraction causes each point on the object to appear spread out on the image. The "point spread function" usually appears as a blurred circle, and when two such point spread functions overlap, the distinction between the two points is lost. The exact shape of the point spread function is determined by the Fourier transform of the aperture. Most telescopes have circular apertures with sharply defined edges, and the "blurred circle" is actually a Bessel function: a bright central disk surrounded by a series of progressively dimmer rings. The shape of the telescope aperture can be modified with an apodization filter. A Gaussian apodization filter produces a Gaussian point spread function, for instance. In every case, the bigger the telescope aperture, the smaller the point spread function.

Figure 4:
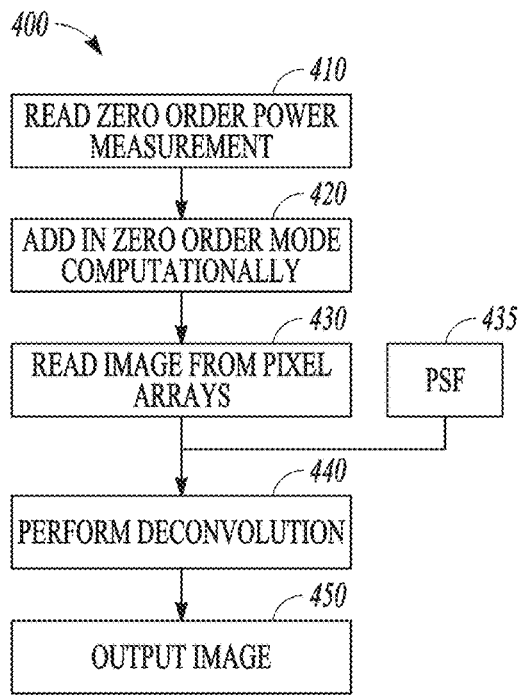
FIG. 4 is a block flow diagram illustrating a computer implemented deconvolution process for computationally reconstructing the image according to an example embodiment.

FIG. 4 is a block flow diagram illustrating a computer implemented deconvolution process 400 for computationally reconstructing the image. After passing through the zero-mode filtering system, the remaining light in each band is captured at the image plane on the detector array. This light would not be recognizable as the object with the zeroth order mode (equivalent in shape to the PSF) missing. Using the amplitude measurement from the Zero Order Mode photodetectors, the zero-order mode is added back in computationally, without noise: Measured Image+Measured zero-order Amplitude*known zero order mode shape=Pre-deconvolved image. Note that there is a small amount of noise on the amplitude, to which the deconvolution is relatively insensitive.

A conventional deconvolution to reconstruct the image may then be performed using any commonly available technique (Weiner filter, Lucy-Richardson, or more advanced nonlinear methods such as neural-networks).

In method 400, the zero-order mode power measurement is read at operation 410 and added in computationally at operation 420. Note that the measurement includes amplitude noise only, since other light is transmitted and not detected. At operation 430, the image data from the pixel arrays is read. The image data, and knowledge of the PSF at operation 435 is used to perform deconvolution at operation 440. An output image is provided at operation 450 for display or storage.

Figure 5:
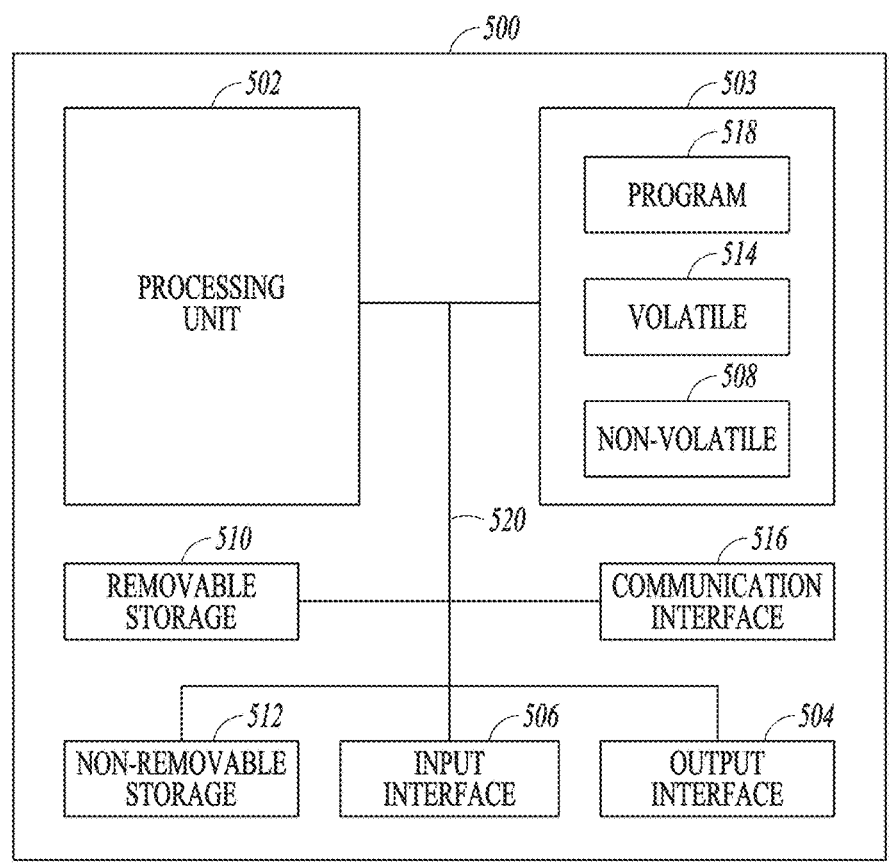
FIG. 5 is a block schematic diagram of a computer system to implement one or more example embodiments.

FIG. 5 is a block schematic diagram of a computer system 500 that may be used to form the controller for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods and algorithms described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A method includes receiving collimated light from an optical imaging system, dividing the received light into multiple bands of wavelength, refocusing each band onto a corresponding diffraction grating having an amplitude function matched to a point spread function (PSF) of the optical imaging system, transmitting light that is not filtered out by the diffraction grating onto a corresponding pixel array, and reconstructing the image from the pixel arrays for each band.

2. The method of claim 1 and further including detecting an intensity of light scattered by each diffraction grating, wherein the image is reconstructed as a function of an average value of detected intensity of scattered light.

3. The method of example 2 wherein the image is reconstructed as a function of the average value of scattered light, the pattern on the pixel arrays, and a pattern corresponding to a source of the light received from the optical imaging system.

4. The method of example 3 wherein the average value of light is empirically determined.

5. The method of any of examples 1-4 wherein the multiple bands comprise at least three bands.

6. The method of any of examples 1-5 wherein the received light is divided by a dichroic beamsplitter for each band.

7. The method of any of examples 1-6 and further including refocusing each band onto successive amplitude function matched diffraction gratings.

8. The method of example 7 wherein the number of successive amplitude function matched diffraction gratings for each band comprise a number sufficient to scatter greater than 85% of light in grating mode.

9. The method of any of examples 1-8 wherein the light received from the optical imaging system comprises light received from a telescope.

10. An image reconstructing device including a beamsplitter positioned to receive light from an object viewed by an optical imaging system, and to divide the received light into multiple bands of wavelength, multiple sets of diffraction gratings, each coupled to receive respective ones of the multiple bands of wavelength light, each diffraction grating having an amplitude function matched to a point spread function (PSF) of the optical imaging system, and multiple pixel arrays coupled to receive light transmitted through respective sets of diffraction gratings such that an image of the object is reconstructable from images sensed by the pixel arrays.

11. The image reconstructing device of example 10 and further including detectors respectively coupled to receive scattered light from the multiple diffraction gratings, and wherein the bands received by the sets of diffraction gratings are collimated.

12. The image reconstructing device of example 11 and further including a controller coupled to receive pixel data from the multiple pixel arrays and intensity data from the detectors.

13. The image reconstructing device of any of examples 10-12 wherein there are at least three sets of diffraction gratings and pixel arrays.

14. The image reconstructing device of any of examples 10-12 wherein there are at least two diffraction gratings per set.

15. A machine-readable storage device having instructions for execution by a processor of a machine to cause the processor to perform operations to perform a method of reconstructing an image of an object being magnified by an optical imaging system that provides light received from the object. The operations include reading zero order power measurements corresponding to refracted light from multiple detectors corresponding to multiple diffraction gratings having amplitude functions matching a point spread function (PSF), adding the zero order power measurements computationally, reading image data from multiple arrays positioned to receive respective bands of light from the optical imaging system and transmitted through the multiple diffraction gratings, and performing deconvolution of the image data and zero order power measurements to generate the image.

16. The device of example 15 wherein the image is generated as a function of the average value of scattered light, the pattern on the pixel arrays, and a pattern corresponding to a source of the light received from the optical imaging system.

17. The device of example 16 wherein the average value of scattered light is empirically determined.

18. The device of any of examples 15-17 wherein the multiple bands comprise at least three hands.

19. The device of any of examples 15-18 wherein the received light is divided by a dichroic beamsplitter for each band.

20. The device of any of examples 15-19 wherein the light received from the optical imaging system comprises light received from a telescope.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method for reconstructing an image from an optical imaging system, the method comprising:
   receiving collimated light from the optical imaging system;
   dividing the received light into multiple bands of wavelength;
   refocusing each band onto a corresponding diffraction grating comprising a contrast mask having an amplitude function pattern matched to a point spread function (PSF) of the optical imaging system;
   detecting an intensity of light scattered by each diffracting grating;
   transmitting light that is not filtered out by each diffraction grating onto a corresponding pixel array; and
   reconstructing the image as a function of an average value or total of detected intensity of scattered light and patterns on the pixel arrays for each band.

2. The method of claim 1, wherein the image is reconstructed as a function of the average value of scattered light, the pattern on the pixel arrays, and a pattern corresponding to a source of the light received from the optical imaging system.

3. The method of claim 2, wherein the average value of light is empirically determined.

4. The method of claim 1, wherein the multiple bands comprise at least three bands.

5. The method of claim 1, wherein the received light is divided by a dichroic beamsplitter for each band.

6. The method of claim 1 further comprising refocusing each band onto successive amplitude function matched diffraction gratings.

7. The method of claim 6, wherein number of successive amplitude function matched diffraction gratings for each band comprise a number sufficient to scatter greater than 85% of light in grating mode.

8. The method of claim 1, wherein the light received from the optical imaging system comprises light received from a telescope.

9. An image reconstructing device for reconstructing an image from an optical imaging system, the image reconstruction device comprising:
   a beamsplitter positioned to receive collimated light from an object viewed by the optical imaging system, and to divide the received light into multiple bands of wavelength;
   multiple sets of diffraction gratings, each coupled to receive respective ones of the multiple bands of wavelength light, each diffraction grating comprising a contrast mask having an amplitude function pattern matched to a point spread function (PSF) of the optical imaging system;
   detectors respectively coupled to receive scattered light from the multiple diffraction gratings;
   multiple pixel arrays coupled to receive light transmitted through respective sets of diffraction gratings; and
   a controller coupled to receive pixel data from the multiple pixel arrays and intensity data from the detectors to reconstruct the image the pixel array.

10. The image reconstructing device of claim 9, wherein there are at least three sets of diffraction gratings and pixel arrays.

11. The image reconstructing device of claim 9, wherein there are at least two diffraction gratings per set.

12. A non-transitory computer readable medium containing instructions that when executed cause at least one processing device to:
   receive collimated light from an optical imaging system;
   divide the received light into multiple bands of wavelength;
   refocus each band onto a corresponding diffraction grating comprising a contrast mask having an amplitude function pattern matched to a point spread function (PSF) of the optical imaging system;
   detect an intensity of light scattered by each diffracting grating;
   transmit light that is not filtered out by each diffraction grating onto a corresponding pixel array; and
   reconstruct the image as a function of an average value or total of detected intensity of scattered light and patterns on the pixel arrays for each band.

13. The non-transitory computer readable medium of claim 12, wherein the image is generated as a function of the average value of scattered light, the pattern on the pixel arrays, and a pattern corresponding to a source of the light received from the optical imaging system.

14. The non-transitory computer readable medium of claim 12, wherein the average value of scattered light is empirically determined.

15. The non-transitory computer readable medium of claim 12, wherein the multiple bands comprise at least three bands.

16. The non-transitory computer readable medium of claim 12, wherein the received light is divided by a dichroic beamsplitter for each band.

17. The non-transitory computer readable medium of claim 12, wherein the light received from the optical imaging system comprises light received from a telescope.

* * * * *